United States Patent
Palaios et al.

(10) Patent No.: US 12,549,451 B2
(45) Date of Patent: Feb. 10, 2026

(54) METHODS AND SYSTEMS FOR REDUCING DATA SHARING OVERHEAD

(71) Applicant: Telefonaktiebolaget LM Ericsson (publ), Stockholm (SE)

(72) Inventors: Alexandros Palaios, Moers (DE); Reza Moosavi, Linköping (SE); Henrik Rydén, Stockholm (SE); Ursula Challita, Solna (SE); Vijaya Yajnanarayana, Bangalore (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 445 days.

(21) Appl. No.: 17/927,118

(22) PCT Filed: May 25, 2020

(86) PCT No.: PCT/EP2020/064469
§ 371 (c)(1),
(2) Date: Nov. 22, 2022

(87) PCT Pub. No.: WO2021/239214
PCT Pub. Date: Dec. 2, 2021

(65) Prior Publication Data
US 2023/0209363 A1 Jun. 29, 2023

(51) Int. Cl.
*H04L 41/16* (2022.01)
*H04L 41/14* (2022.01)
(Continued)

(52) U.S. Cl.
CPC .......... *H04L 41/16* (2013.01); *H04L 41/145* (2013.01); *H04L 41/40* (2022.05); *H04W 16/22* (2013.01); *H04L 41/0895* (2022.05)

(58) Field of Classification Search
CPC ............ H04L 41/0806; H04L 41/0826; H04L 41/0895; H04L 41/145; H04L 41/16;
(Continued)

(56) References Cited

U.S. PATENT DOCUMENTS 11,908,193 B2 * 2/2024 Balabin .................. G06V 10/82
2016/0306922 A1 * 10/2016 van Rooyen .......... G16B 50/30
(Continued)

FOREIGN PATENT DOCUMENTS

EP 3109771 A1 * 12/2016

OTHER PUBLICATIONS

International Search Report and Written Opinion issued in International Application No. PCT/EP2020/064469 dated Feb. 11, 2021 (16 pages).

*Primary Examiner* — Hirdepal Singh
(74) *Attorney, Agent, or Firm* — Rothwell, Figg, Ernst & Manbeck, P.C.

(57) ABSTRACT

Methods and systems for reducing data sharing overhead based on similarities of datasets. In one aspect, there is a computer implemented method (1200) for reducing the amount of data transmitted to a network node (102) of a wireless communication system (100). The network node is configured to use the data to create or modify a model. The method is performed by the network node and comprises obtaining (s1202) information identifying a set of available datasets (152-158) and obtaining (s1204) a set of similarity scores. The method also comprises based on the obtained similarity scores, selecting (s1206) a subset of the set of available sets. The method further comprises transmitting (s1208) a request for each dataset included in the subset, receiving (s1210) the requested datasets, and using (s1212) the received datasets to construct or modify a model.

18 Claims, 13 Drawing Sheets

(51) Int. Cl.
   *H04L 41/40*    (2022.01)
   *H04W 16/22*    (2009.01)
   *H04L 41/0895*  (2022.01)

(58) Field of Classification Search
   CPC . H04L 41/40; H04L 41/5019; H04L 43/0876;
        H04L 41/147; H04W 16/18; H04W 16/22
   USPC ........................................................ 455/446
   See application file for complete search history.

(56) References Cited

U.S. PATENT DOCUMENTS

| | | | |
|---|---|---|---|
| 2018/0046926 A1 | 2/2018 | Achin et al. | |
| 2018/0075104 A1* | 3/2018 | Oberbreckling | G06F 16/254 |
| 2020/0005191 A1* | 1/2020 | Ganti | G06N 20/00 |
| 2020/0145304 A1 | 5/2020 | Wulff et al. | |
| 2020/0403889 A1* | 12/2020 | Nguyen | H04L 41/0661 |
| 2024/0311851 A1* | 9/2024 | Jackson | G06N 3/126 |

* cited by examiner

METHODS AND SYSTEMS FOR REDUCING DATA SHARING OVERHEAD

CROSS REFERENCE TO RELATED APPLICATIONS

This application is a 35 U.S.C. § 371 National Stage of International Patent Application No. PCT/EP2020/064469, filed 2020 May 25.

TECHNICAL FIELD

Disclosed are embodiments related to methods and systems for reducing data sharing overhead.

BACKGROUND

Machine learning (ML), artificial intelligence (AI) techniques, and data analytics require datasets. Collecting datasets from one or more data sources, however, can be an expensive process because a large amount of network resources may be needed for the transfer of the datasets. As the number of datasets increases, the cost of retrieving the datasets becomes more expensive. As used herein, a "dataset" is collection of data, such as, for example, sensor-measurements. A dataset itself may consists of multiple datasets (e.g., a dataset of sensor measurements may consists of a set of temperature measurements and a set of humidity measurements).

SUMMARY

Quite often one dataset may be similar to (e.g., highly correlated with) another dataset. For example, two data sources (e.g., two base stations or two sensors) may be positioned near each other in very dense deployments, and thus may be highly correlated, and, therefore the dataset produced by one of the two data sources may be similar to the dataset produced by the other data source. Thus, retrieving both of these datasets (which have a high correlation) might not be justified when the cost of transferring data is high. Accordingly, certain challenges currently exist. For example, to build an accurate ML model for predicting a certain target variable, a large amount of data may be needed. In general, the more data that is used to train the ML model, the better the prediction accuracy will be. In a wireless network, a ML model might use data from multiple data sources for training and/or prediction. But, as noted above, retrieving a large amount of data can be costly, particularly when the cost of data transfer is high, leading to a high cost for the intended ML application. In wireless communications this cost can be expressed in terms of limited bandwidth and/or the cost of acquiring more bandwidth for sharing such type of information.

Currently, all of the datasets that are available to be used in ML model training are treated with equal importance and it is not possible to treat them differently based on how similar they are. This means that, in current ML model building methods, all of the available datasets need to be transferred to the node performing the ML model training.

This disclosure aims to overcome this problem by providing methods and systems for determining how similar two datasets are, using that information to select a subset of all of the available datasets, and then just using the datasets that are included in the selected subset. The embodiments disclosed herein reduce the cost of transferring data between nodes in a network by using data a similarity metric (a.k.a., data similarity score) to reduce the probability that redundant information is transferred. In one embodiment, each data source keeps data-similarity metrics that indicate the degree to which the data source's dataset is similar to other datasets maintained by other data sources. In such an embodiments, an agent, based on a cost function, picks a number of datasets (and/or data sources) to use that are less similar.

In one aspect, there is a computer implemented method for reducing the amount of data transmitted to a network node of a wireless communication system. The network node is configured to use the data to create or modify a model. The method may be performed by the network node. The method comprises obtaining information identifying a set of N available datasets, wherein N is greater than or equal to 2. The method further comprises obtaining a set of similarity scores. Each similarity score indicates a similarity between one of the available datasets included in the set of N available datasets and another one of the available datasets included in the set of N available datasets. The method further comprises, based on the obtained similarity scores, selecting a subset of the set of N available sets. The number of available datasets included in the selected subset is M, where M is less than N. The method further comprises, for each available dataset included in the selected subset of available datasets, transmitting a request for the dataset. The method further comprises receiving the requested datasets and using the received datasets to construct or modify a model.

In another aspect, there is provided an apparatus for reducing the amount of data transmitted to the apparatus. The apparatus is configured to use the data to create or modify a model. The apparatus is further configured to obtain information identifying a set of N available datasets, wherein N is greater than or equal to 2. The apparatus is further configured to obtain a set of similarity scores. Each similarity score may indicate a similarity between one of the available datasets included in the set of N available datasets and another one of the available datasets included in the set of N available datasets. The apparatus is further configured to, based on the obtained similarity scores, select a subset of the set of N available sets. The number of available datasets included in the selected subset is M, where M is less than N. The apparatus is further configured to, for each available dataset included in the selected subset of available datasets, transmit a request for the dataset. The apparatus is further configured to receive the requested datasets and use the received datasets to construct or modify a model.

In another aspect there is provided a computer program comprising instructions which when executed by processing circuitry causes the processing circuitry to perform any of the methods disclosed herein.

An advantage of the embodiments disclosed herein is that they substantially reduce the amount of data that is shared between entities while protecting the quality of a model produced by the data. This improves the energy efficiency and provides less overhead in total.

BRIEF DESCRIPTION OF THE DRAWINGS

The accompanying drawings, which are incorporated herein and form part of the specification, illustrate various embodiments.

DETAILED DESCRIPTION

A user equipment (UE) or any other network node may wish to build a model based on datasets retrieved from other nodes in a network.

Figure 1:
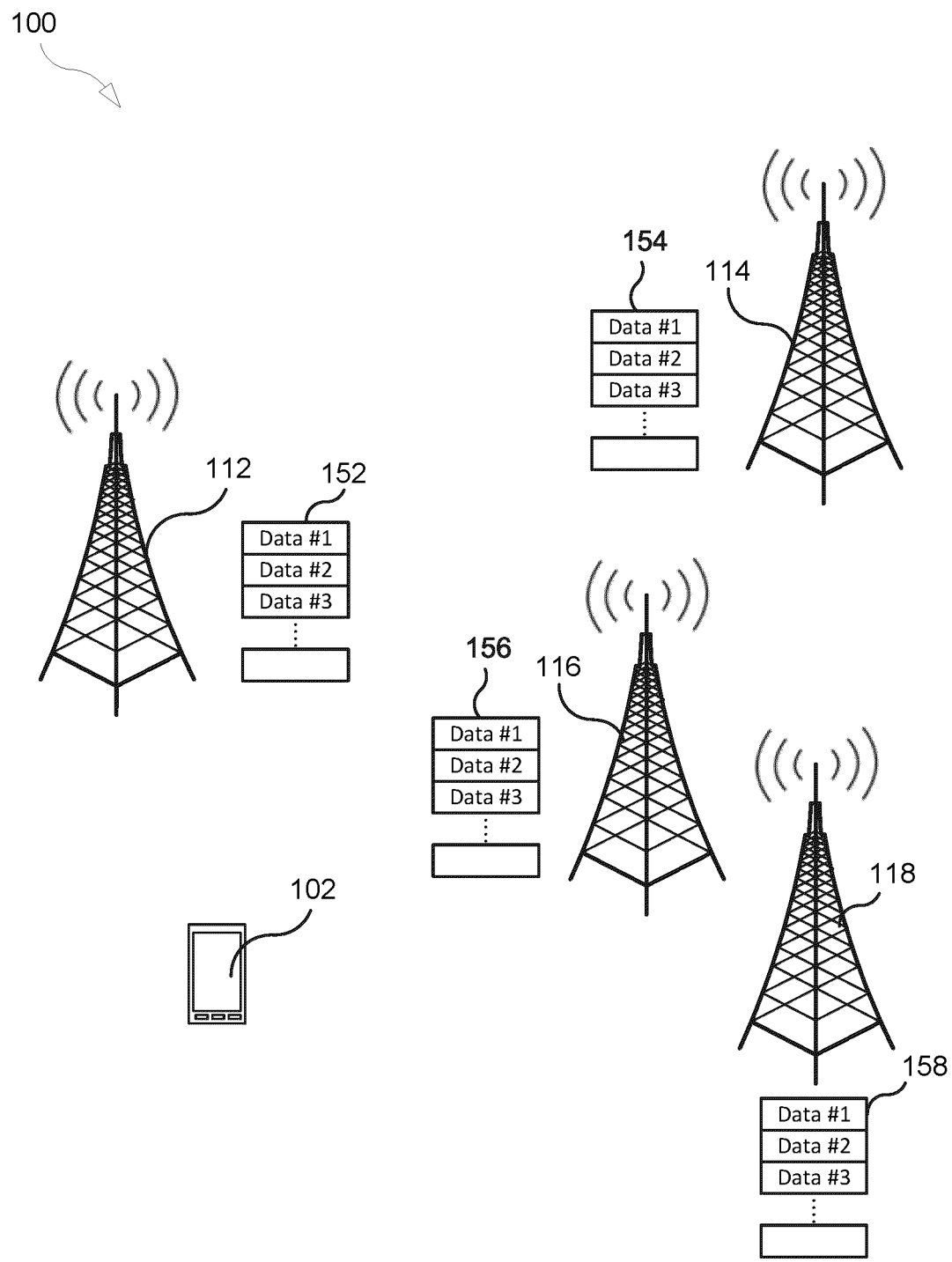
FIG. 1 is a system according to an embodiment.

FIG. 1 illustrates a system 100 according to some embodiments. The system 100 comprises a user equipment (UE) 102 and four potential data sources—data source (DS) 112, DS 114, DS 116, and DS 118. In the system 100, the UE 102 wants to build a model (e.g., a ML model) based on data provided from the DSs 112-118. DS 112 is the most distant one from DSs 114, 116, and/or 118 and DS 116 is closer to DS 118 than DS 114. Even though FIG. 1 shows that each of the DSs 112-118 is a base station, any other network entity may be used as a DS. Also the number of the DSs and the UE(s) shown in FIG. 1 is provided just for illustration purpose and does not limit the embodiments of this disclosure in any way.

Base stations that are close to each other will typically have similarities between captured datasets. Even though a distance between the base stations is used here to explain the concept of similarities, many other factors may affect the similarities. Thus, base stations that are far apart may still have similar captured datasets. For example, two base stations that operate in different areas having the same characteristics (e.g., population density) might also be highly similar in terms of collected datasets.

Similarities between different datasets may be measured and/or expressed using various similarity metrics (e.g., metrics from information theory or simpler statistical language). For example, the similarities may be measured and/or expressed using correlations.

Figure 2:
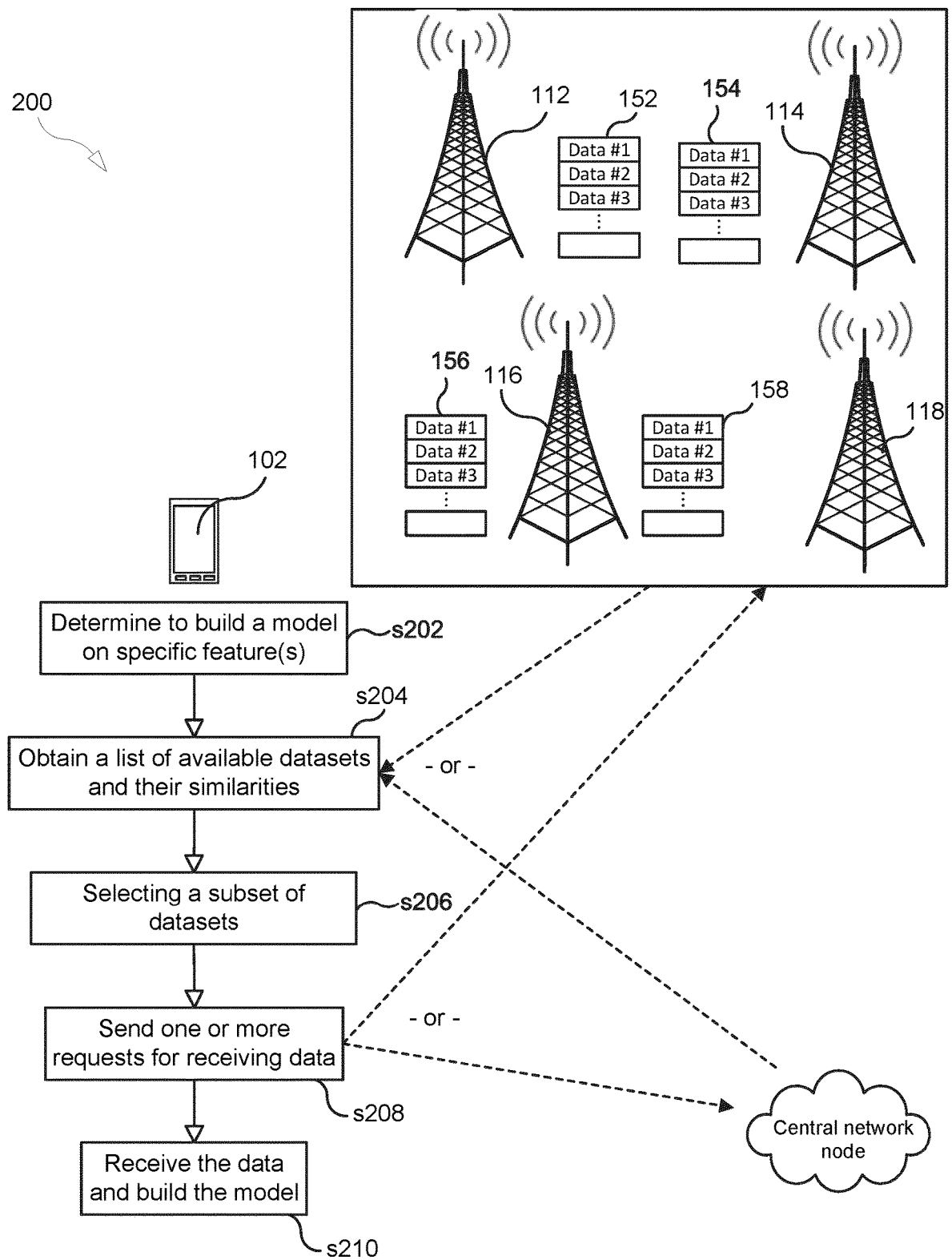
FIG. 2 is a process according to an embodiment.

FIG. 2 shows a process 200 for building a model (e.g., an analytical model or a ML model) according to some embodiments. The method may be performed by a network entity (e.g., UE 102, a base station, a server, etc.).

The process 200 may begin with step s202. In step s202, the UE 102 determines to build a model based on datasets (e.g., the datasets 152-158) associated with DSs (e.g., the DSs 112-118). In FIG. 2, the DSs are base stations. Each of the datasets may include a single "feature dataset" (i.e., a set of data associated with a single feature) or may include multiple feature datasets. A feature may be any measurable parameter (e.g., a measurable parameter related to the operation of the DSs). For example, the feature may be the temperature and/or the humidity of the environment in which each DS operates.

Table 1 below represents an exemplary dataset comprising four feature datasets.

TABLE 1

|   | F1   | F2   | F3   | F4   |
|---|------|------|------|------|
| 1 | V1, 1 | V2, 1 | V3, 1 | V4, 1 |
| 2 | V1, 2 | V2, 2 | V3, 2 | V4, 2 |
| 3 | V1, 3 | V2, 3 | V3, 3 | V4, 3 |

TABLE 1-continued

|   | F1   | F2   | F3   | F4   |
|---|------|------|------|------|
| . | .    | .    | .    | .    |
| . | .    | .    | .    | .    |
| . | .    | .    | .    | .    |
| N | V1, N | V2, N | V3, N | V4, N |

In this example, four features are defined (F1, F2, F3, and F4) and the dataset consists of N data records, where each data record contains one value for each of the four defined features. For example, record 3 contains values V1,3; V2,3; V3,3; and V4,3 corresponding to features F1, F2, F3, and F4, respectively. Accordingly, the dataset contains four feature datasets, one for each of the four features. More specifically, feature dataset i (i=1, 2, 3, or 4) contains values Vi,1 to Vi,N. For example, the feature dataset for feature F1 contains values V1,1; V1,2, V1,3; . . . ; and V1,N. As used herein a "value" may be scalar value (i.e., single value) or a set of values (e.g., a multi-dimensional vector).

After performing step s202, in step s204, the UE 102 obtains (i) a list of available datasets (e.g., the datasets 152-158) and (ii) similarity scores between the datasets (e.g., similarity scores between feature datasets for the same feature). In this example, a similarity score indicates a similarity between a dataset associated with a data source (e.g., DS 112) included in the list and another dataset associated with another data source (e.g., DS 114) included in the list. Table 2 shown below shows similarity scores among the datasets 152-158 shown in FIG. 1.

TABLE 2

|            | Dataset 152 | Dataset 154 | Dataset 156 | Dataset 158 |
|------------|-------------|-------------|-------------|-------------|
| Dataset 152 | —           | 2           | 5           | 3           |
| Dataset 154 | 2           | —           | 6           | 7           |
| Dataset 156 | 5           | 6           | —           | 8           |
| Dataset 158 | 3           | 7           | 8           | —           |

To obtain the similarity scores, the UE 102 may (1) retrieve the datasets from the DSs (e.g., the DSs 112-118) (by optionally specifying the data format) and calculate the similarity scores between the datasets or (2) retrieve a similarity matrix like Table 2 containing the similarity scores from a central network node (e.g., a cloud) where the similarity scores are calculated.

In one embodiment, if N available datasets each have a single feature dataset corresponding to the same feature (e.g., temperature), then there will be a single similarity score matrix. That is, for any pair of available datasets included in the set of N available datasets, there will be a single similarity score indicating the similarity between the datasets in the pair.

If, however, each dataset includes multiple feature datasets corresponding to the same set of features (e.g., temperature and humidity), then there may be multiple similarity score matrices (e.g., one for temperature measurements and one for humidity measurements). That is, for any pair of available datasets, there will be multiple similarity scores indicating the similarity between the feature datasets in the pair. In this embodiment, one can use a weighted sum approach to generate a single similarity score indicating the similarity between the pair of datasets. As a specific example, assume that a first dataset has a first feature dataset for a first feature (f1) and a second feature dataset for a second feature, and assume that a second dataset has a first feature dataset for the first feature (f1) and a second feature dataset for the second feature. In this scenario, there will be two similarity scores for this pair of datasets—i.e., 1) a first similarity score (sc1) indicating the similarity between the first feature dataset of the first dataset and the first feature set of the second dataset and 2) a second similarity score (sc2) indicating the similarity between the second feature dataset of the first dataset and the second feature set of the second dataset. Using sc1 and sc2, one can calculate a similarity score (SC) indicating the similarity between the first dataset and the second datasets. For example, this similarity score (SC) can be calculated as follows: SC=(w1×sc1)+(w2×sc1), where w1 and w2 are predetermined weights and w1+w2=1. The weights may be selected based on the relative importance between f1 and f2. For instance, if f1 and f2 are equally important, than w1=w2=0.5, but if f1 is more important than f2, then w1>w2.

After performing step s204, the UE 102 selects a subset of datasets from the list of available datasets (step s206). There are different ways of selecting the subset of datasets. One exemplary process of selecting the subset of datasets is shown in FIG. 3.

Figure 3:
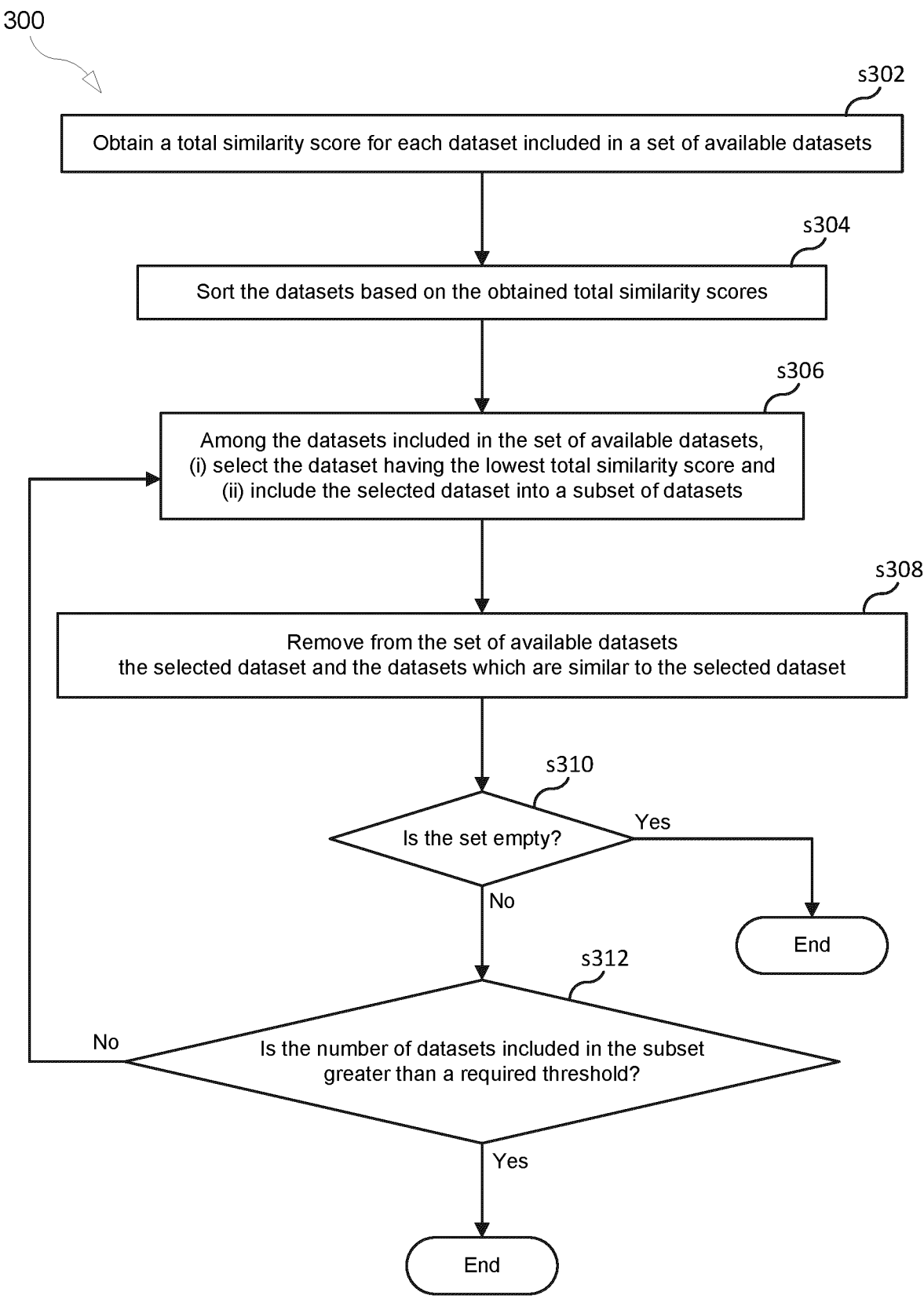
FIG. 3 is a process according to an embodiment.

FIG. 3 shows an exemplary process 300 of selecting the subset of datasets from the set of available datasets (e.g., the datasets 152-158). The process 300 may begin with step s302.

Step s302 comprises obtaining a total similarity score for each dataset included in the set of available datasets. The total similarity score for a given dataset identifies the total number of similarity scores that i) are associated with the given dataset and ii) that satisfies a condition. For example, as illustrated above in Table 2, each dataset has three similarity scores. For instance, dataset 152 is associated with the following similarity scores: 2, 5 and 3. If the condition is that the similarity score must be greater than or equal to 5, then the total similarity score for dataset 152 is 1 because there is only one similarity score that is associated with dataset 152 and that is greater than or equal to 5. In this example, if a first dataset and a second dataset have a similarity score of 5 or greater, then it is determined that the first and second datasets are "similar." Accordingly, a particular dataset's total similarity score identifies the total number of datasets to which the particular dataset is similar. That is, in this example, dataset 152 is similar with only one other dataset—i.e., the dataset 156.

After obtaining the total similarity score for each dataset, in step s304, the datasets are sorted based on the obtained total similarity scores. Specifically, the datasets may be sorted based on the similarity score of each dataset. In the example provided above, the datasets are sorted as shown in table 3 below.

TABLE 3

| Dataset | Total Similarity Score |
|---|---|
| Dataset 152 | 1 |
| Dataset 158 | 2 |
| Dataset 154 | 2 |
| Dataset 156 | 3 |

In step s306, among the sorted datasets, the dataset having the lowest total similarity score (e.g., dataset 152) is selected and included into the subset of dataset.

After selecting the dataset having the lowest total similarity score, in step s308, (i) the selected dataset and (ii) the datasets which are similar to the selected dataset are removed from the set of available datasets. Whether two datasets are similar or not may be determined based on a similarity score and a similarity threshold value. For example, two datasets having a similarity score that is greater than or equal to the similarity threshold value may be considered to be similar.

In the example provided above, the similarity threshold value is 5. In case the dataset that is selected in step s306 is the dataset 152, then in step s308 dataset 152 and the dataset that is similar to dataset 152—i.e., the dataset 156—are removed from the set of available data sets.

Step s310 comprises determining whether the set of available datasets is empty or not. If the set is empty, the process 300 ends. Otherwise, the process 300 proceeds to step s312. Step s312 comprises determining whether the number of datasets included in the subset is greater than (and/or equal to) a required threshold. The required threshold may correspond to the number of datasets required and/or desired for building a desired model (e.g., a ML model).

If the number of datasets included in the subset is greater than (and/or equal to) the required threshold, there is no reason to select and include another dataset into the subset. Thus, the process 300 ends. Otherwise, i.e., if more datasets are needed to build a model, the process 300 returns to step s306. Step s306 is performed on the updated set of available datasets. In the example provided above, the updated set includes only the datasets 156 and 158 because the datasets 152 and 154 are removed from the set.

Referring back to process 200 shown in FIG. 2, after the subset of datasets is selected in step s206, in step s208, the UE 102 sends one or more requests for receiving the datasets included in the subset. The request is forwarded either directly to the DSs associated with the datasets included in the subset (i.e., selected in in step s206), or to a central network node (i.e., a cloud). The request may also indicate the format of data to be received.

After performing the step s208, in step s210, the UE 102 receives from the DSs selected in step s208 or from the central network node the requested datasets and builds the model (e.g., a ML model) using the retrieved datasets.

Optionally, if the UE 102 requires better performance from the model, the UE 102 may request data from additional DSs by repeating the above step s206 through s210. The UE 102 may also optionally signal the correlations to the other network nodes. Additionally, the UE 102 may optionally perform the steps s202-s210 again after a time interval T has passed or after a particular condition is met.

EXAMPLES

V2X Application

A vehicle-to-everything (V2X) application performs a quality-of-service (QoS) prediction. The QoS prediction refers to the capability of the application finding out in which areas a specific QoS can be achieved. For the V2X application, exploiting dataset correlations is an important enabler that reduces the amount of data that is needed for model sharing. For example, to build such predicting capability, various feature datasets (e.g., available capacity and utilization) at different base stations are needed.

As explained above, the V2X application (especially those performing the QoS prediction) triggers the creation of a model which needs to collect feature datasets. Due to dense deployment of base-stations in future wireless systems, the base-stations within a small area will have similar number of vehicles connected to them, and thus several base-station parameters (a.k.a., features) (e.g., utilization, throughput, load, etc.) of the base stations would be similar. This helps the model building process to use less BS sources, thereby reducing drastically the overhead for the model training. That is, for example, because the "load" feature dataset produced by one base station may be similar to the "load" feature dataset produced by another base station, the V2X application can become aware of this situation by obtaining the similarity score for this pair of feature datasets and then use that similarity score to decide to request the "load" feature dataset from only one of the two base stations, rather than retrieving the "load" feature dataset from both of the base stations, thereby saving network costs.

An Over the Top Application

The following example provides an over the top approach that uses the embodiments of this disclosure.

An algorithm (e.g., an application) is trying to predict road congestions by looking at the speed of cars. The base stations have the information (i.e., the speed of the cars) that needs to be transferred to the application. Since the number of cars can be extremely large, the embodiments of this disclosure allow a big reduction of transferred data by exploiting correlations provided by the network.

Figure 4:
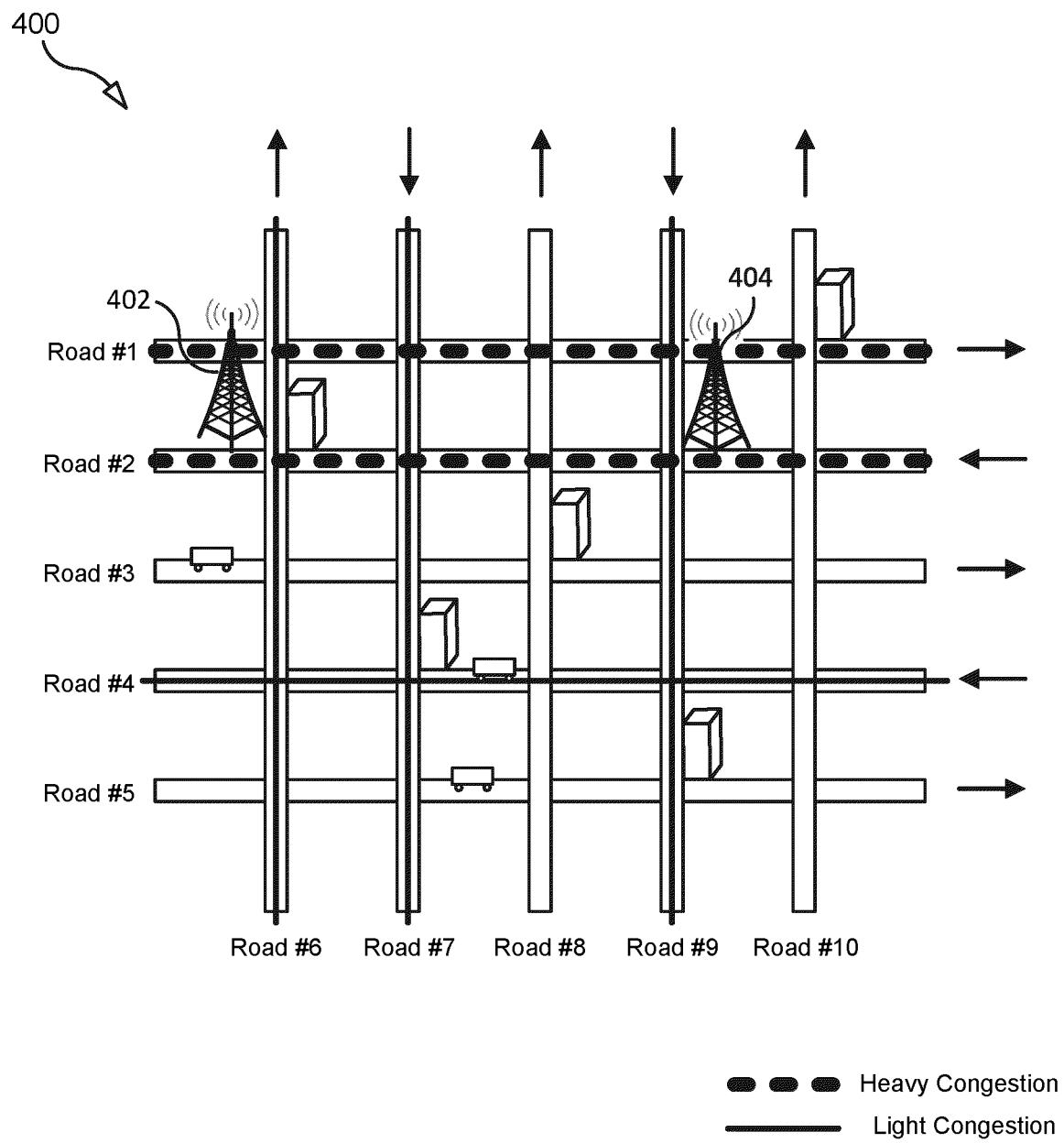
FIG. 4 is an exemplary scenario.

FIG. 4 shows a scenario 400 showing traffic congestion. In the scenario 400, two base stations 402 and 404 are located in two different neighborhoods but they are strongly correlated to each other in terms of achievable speeds of the cars on the roads in the neighborhoods. The correlation between the base stations 402 and 404 is a simple effect of the road network shown in FIG. 4. The algorithm that needs the information (e.g., the speed of cars) to build a prediction model may exploit the correlation between the base stations 402 and 404, and thus may need to acquire the dataset from only one of the two base stations.

Predicting a Capacity

Two base stations—base stations 402 and 404—may operate in very similar environments. For example, densities of users are typically similar in urban-central areas. The variation of the density of user with time is also similar for these base-stations. For example, during peak hour traffic, the capacity handled by the base stations 402 and 404 are both high. This correlation may be used to predict the capacity of one of the base stations (e.g., the base station 402) in a less computational way by knowing the precise capacity of the other base station (e.g., the base station 404).

Provisioning for Network Slice

In a typical 5G network, network slices are activated, re-configured, and de-activated to support certain critical use-cases. In this system, the orchestrator needs to provision the resources to slices to meet Service Level Agreement (SLA) requirements for those use-cases. In general, the resource provisioning algorithm is a computationally complex task. For example, in the scenario shown in FIG. 4, an ML model can predict the future needs of a slice using the base station 402 and does provisioning of resources by soliciting measurements from the base station 402 on parameters (e.g., channel measurements, traffic-handled, etc). This learning can be transferred to the base station 404 by exploiting the correlation between the sites. For example, if the base stations 402 and 404 are highly correlated, then, without soliciting measurements from the base station 404, the orchestrator can reuse the same type of provisioning for slices using the base station 404.

Determining the Data Similarity Scores

Figure 5:
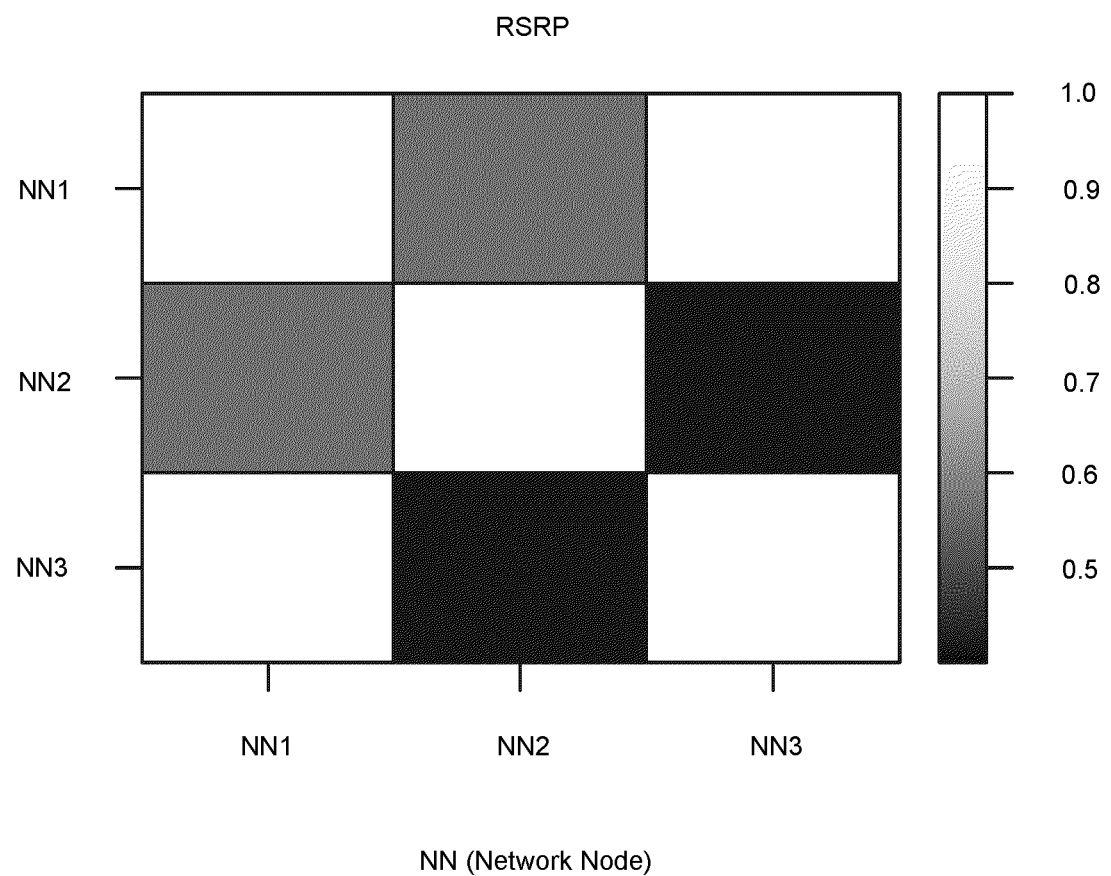
FIGS. 5 and 6 are exemplary correlation matrices.
Figure 6:
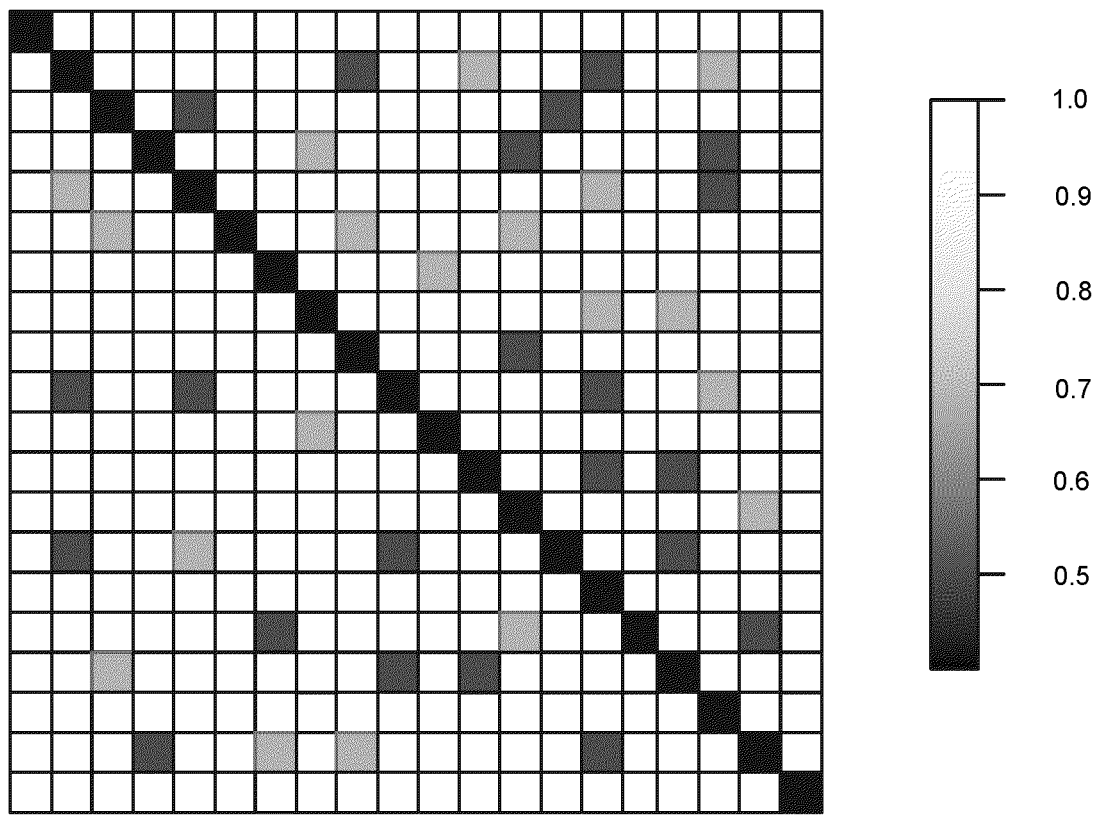

One way of determining a data similarity score is calculating correlations between datasets (e.g., feature datasets). In some embodiments, datasets need to be shared at least one time so that the correlations between the datasets can be determined. After sharing the datasets, each data source (e.g., network node) calculates a correlation matrix per tracked feature between different datasets. FIGS. 5 and 6 show correlation matrices of Reference Signal Receive Power (RSRP) measurements between different network nodes. That is, each of network nodes 1, 2, and 3 has generated an "RSRP" feature dataset and the figures show the correlations between these RSRP feature datasets.

In addition to the correlations or as an alternative to correlations, other metrics may also be used to describe how alike two potential data sources might be. Statistical estimates or information theory techniques can also be applied.

Calculating Correlations

Figure 7:
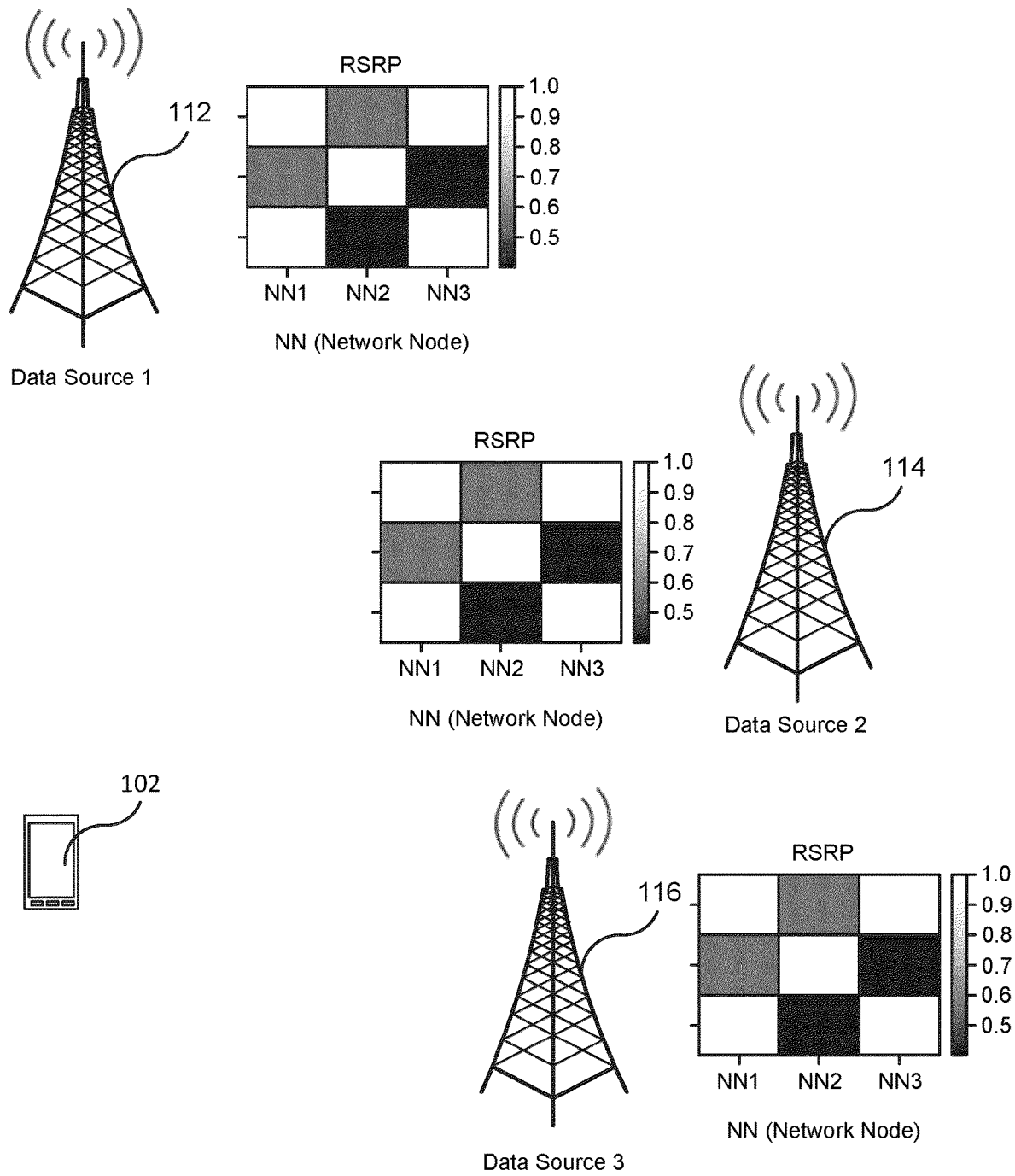
FIGS. 7 and 8 illustrates methods of sharing data.

In one embodiment, datasets are exchanged among all the nodes that generate an available dataset, and thus each node computes the correlations and stores them locally, as shown in FIG. 7.

Figure 8:
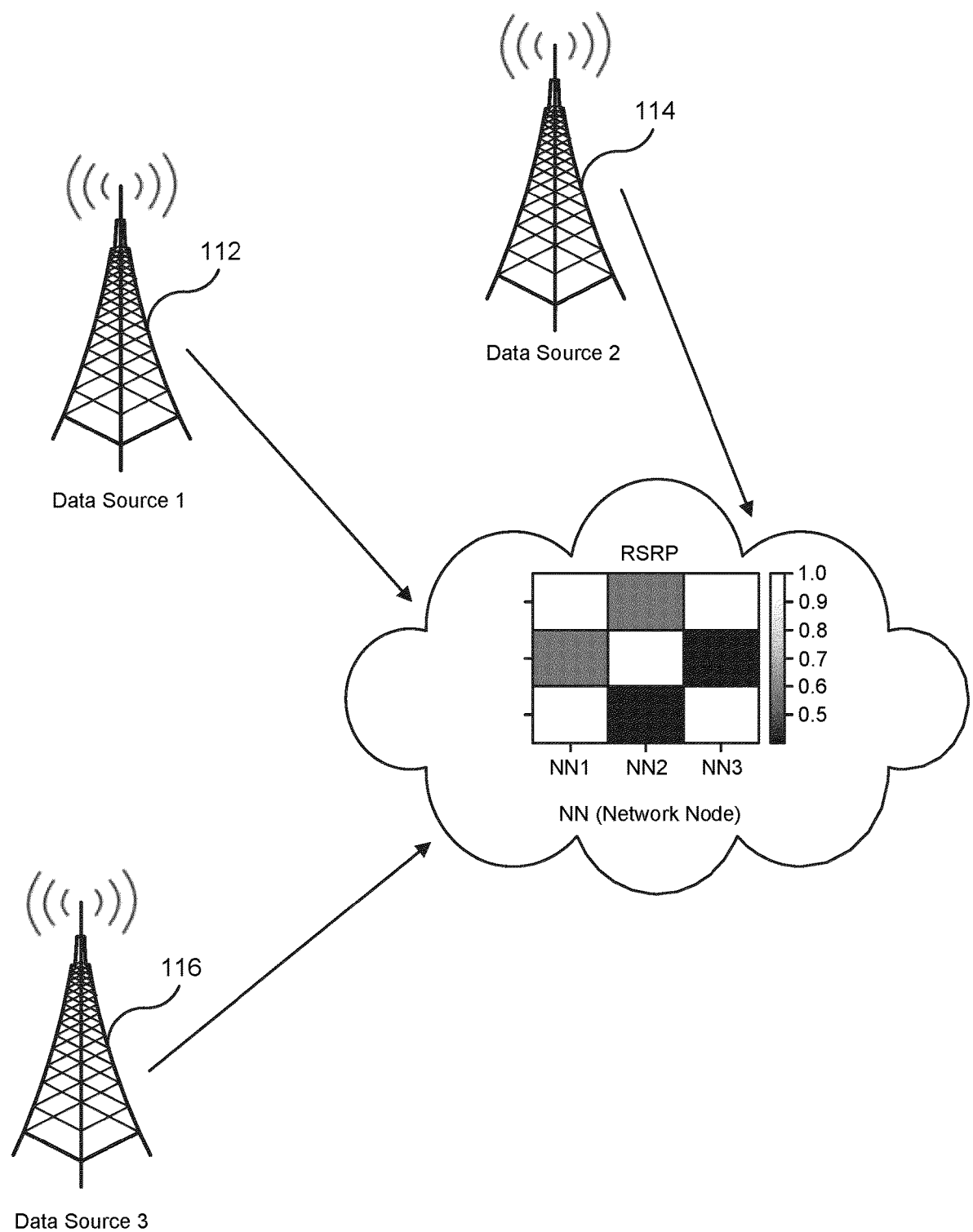

In another embodiment, each node transfers its data set to a central entity, as shown in FIG. 8. Once the available datasets are collected from all nodes, the central entity computes the correlations. Each node may fetch the correlations from the central entity whenever needed. In yet another embodiment, the central entity sends the correlations back to the nodes so that each node stores the correlations locally.

Figure 9:
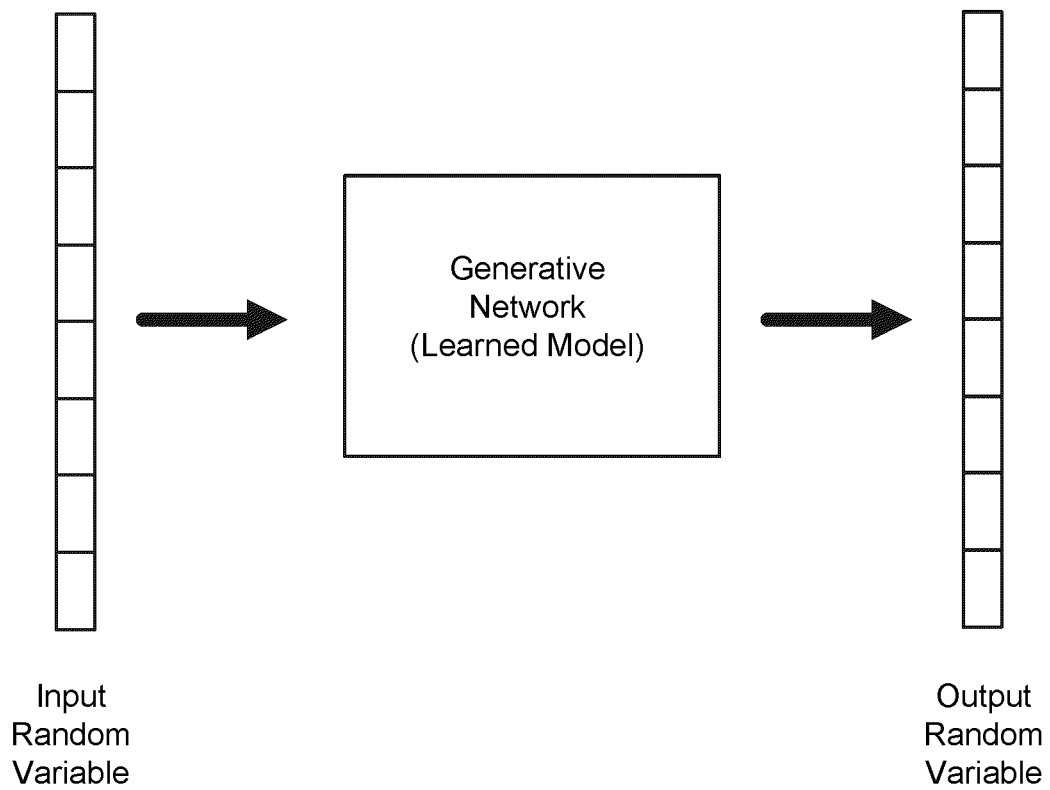
FIG. 9 is a method of transferring descriptive information about large dataset according to one embodiment.

In yet another embodiment, instead of sharing the datasets, a descriptive model that can generate the datasets is transferred. FIG. 9 is an exemplary technique of how descriptive information about large dataset can be transferred in an economic way. In the technique shown in FIG. 9, instead of sharing the raw datasets, a generative network that creates data resembling closely to the raw data is shared.

Reevaluating Data Similarity Metrics

Calculating similarity metrics for data between features can be an expensive procedure since it may require an exchange of the datasets. This is the reason why once these metrics are calculated, they can be shared for at least a time interval T or until an expiration event occurs. Setting the calculated metrics to be shared only for the time interval T or only until the expiration event occurs prevents sharing of old correlations that can be of a poor quality. After the time interval T has passed or the expiration event has occurred, correlations are reevaluated. The followings are three different approaches for triggering reevaluations of the correlations.

Figure 10:
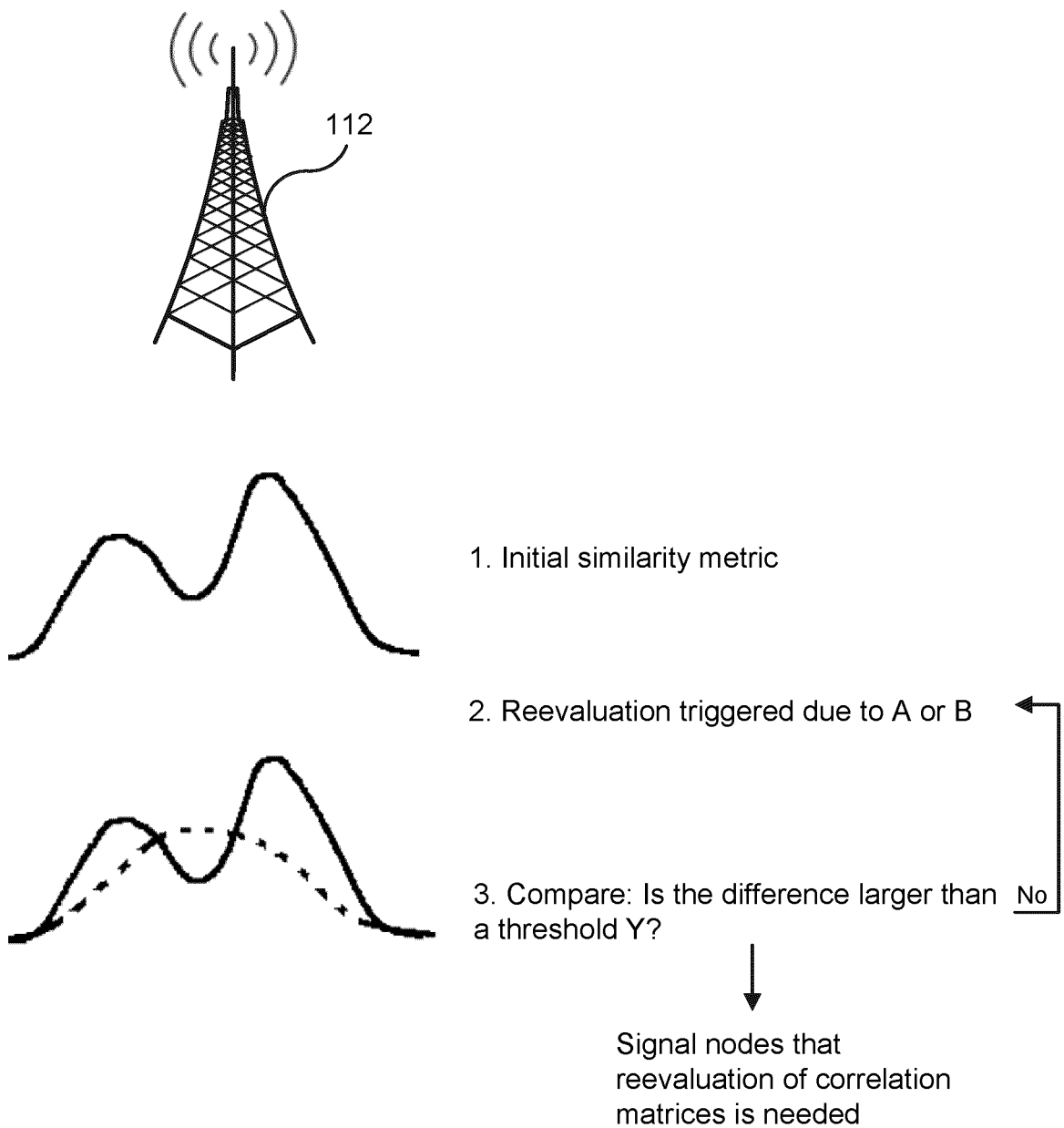
FIG. 10 is a process of reevaluating data similarity.

(1) An Aperiodic/Event-Based/Kullback-Leibler (KL) Divergence Approach for Re-Evaluating Correlations To avoid sharing a large amount of data, each network node may start the process for evaluating the correlation matrix for a feature once it finds out that a new data set is different from the previously tracked data (e.g., quantity). This is illustrated in FIG. 10. FIG. 10 shows a process of reevaluating data similarity based on changes on a dataset. The measurement of the difference between an initial distribution and a newer one can be made using one of the known techniques like distribution similarity metrics. The KL distance between distributions can be useful in this purpose. For example, if the discrete probability distributions of feature is $x=\{x_1, \ldots, x_n\}$ and the newly received data for the feature has the distribution, $y=\{y_1, \ldots, y_n\}$ then $$KL(x, y) = \sum_{i=0}^{n} x_i \cdot \log_2(x_i/y_i)$$

(2) A Periodic Approach for Reevaluating Correlations

The correlations may also be reevaluated periodically after a time T, where T is a function of the underlying application.

(3) A UE-Triggering Approach for Reevaluating Correlations

In some embodiments, the need for reevaluation of the correlations may be assessed with the help of a UE or a subset of UEs. According to this scheme, a UE (or a subset of UEs) requesting access to the data is instructed to evaluate the correlations and report them back to a network. The network then compares the correlations reported by the UE(s) with the stored correlations and it initiates the reevaluation process if the network finds discrepancies between the correlations reported by the UE(s) and the stored correlations.

Correlations being Calculated at a Central Node (i.e., a Cloud)

Figure 11:
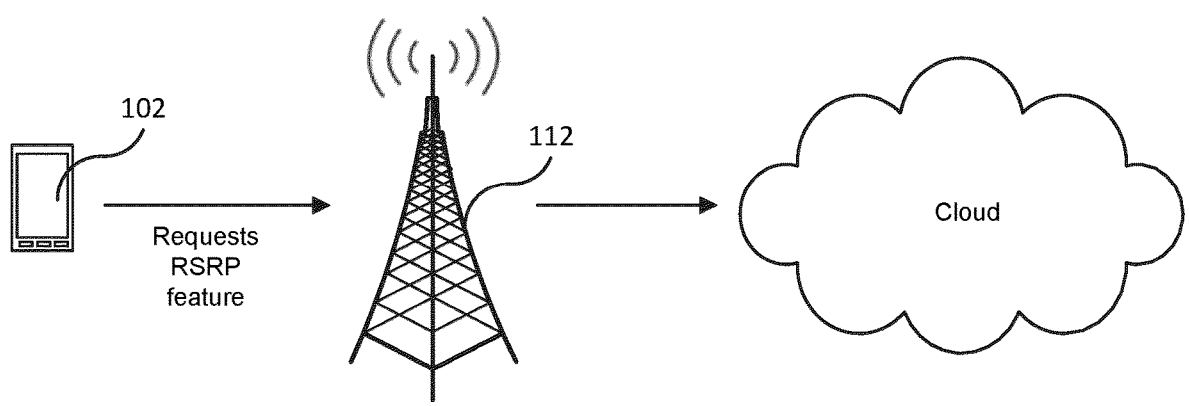
FIG. 11 is an exemplary way of calculating similarities according to one embodiment.

In some embodiments, the complex task of computing correlations may be performed at a centralized cloud server. This server collects data from network nodes and computes one or more correlation matrices, as shown in FIG. 8. This cloud server may also offer services to the network nodes for uploading new observations to update the correlation model (e.g., the correlation matrices). The server may also provide services so that a network node can query the correlation model and transfer it back to a UE, as shown in FIG. 11.

Figure 12:
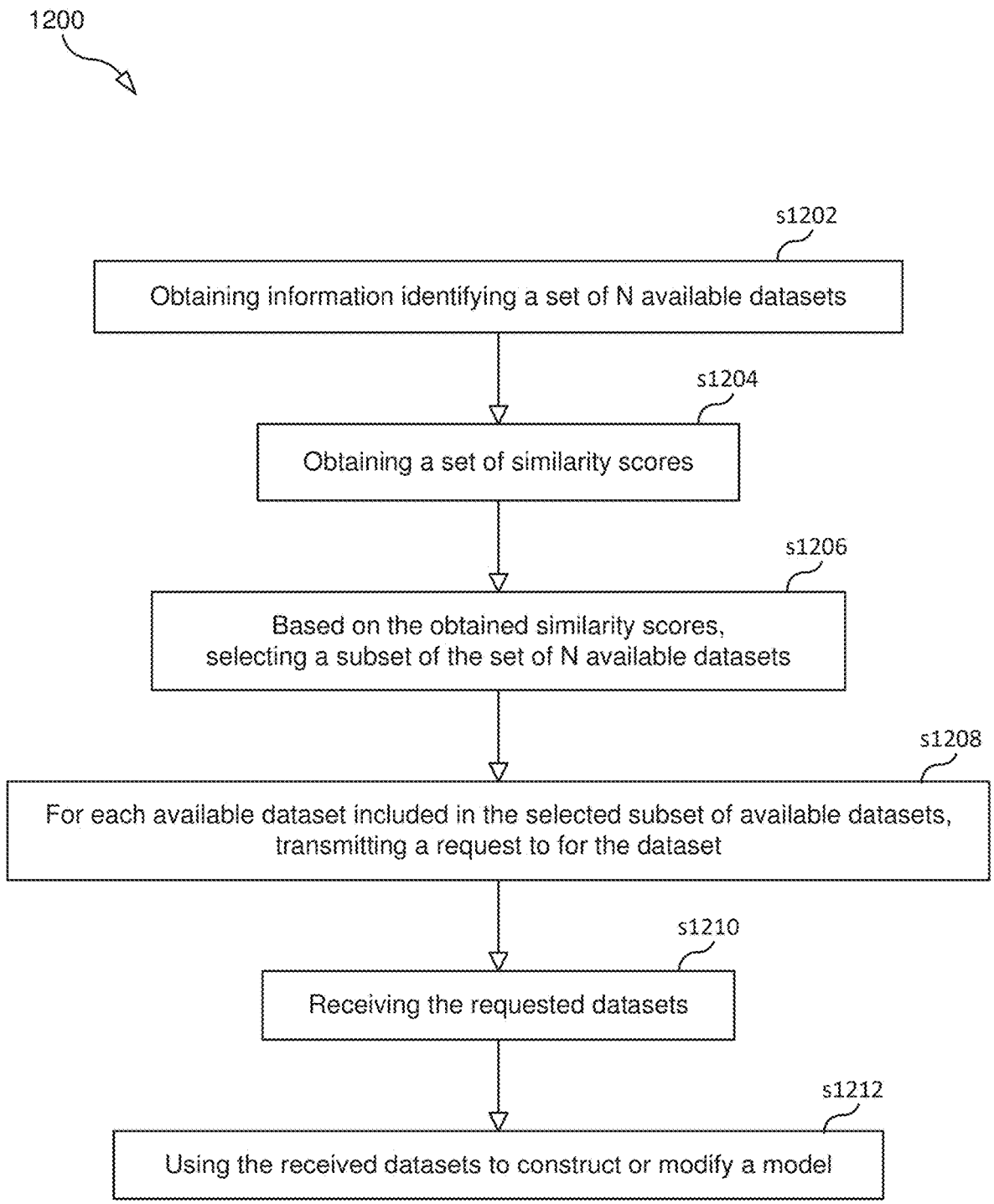
FIG. 12 is a process according to an embodiment.

FIG. 12 is a flow chart illustrating a process 1200 for reducing the amount of data transmitted to a network node of a wireless communication system. The network node may be configured to use the data to create or modify a model. The process may be performed by the network node. The process 1200 may begin with step s1202.

Step s1202 comprises obtaining information identifying a set of N available datasets. N is greater than or equal to 2.

Step s1204 comprises obtaining a set of similarity scores. Each similarity score may indicate a similarity between one of the available datasets included in the set of N available datasets and another one of the available datasets included in the set of N available datasets.

Step s1206 comprises based on the obtained similarity scores, selecting a subset of the set of N available datasets. The number of available datasets included in the selected subset is M, where M is less than N.

Step s1208 comprises, for each available dataset included in the selected subset of available datasets, transmitting a request for the dataset.

Step s1210 comprises receiving the requested datasets.

Step s1212 comprises using the received datasets to construct or modify a model.

In some embodiments, each one of the N datasets is a feature dataset.

In some embodiments, each one of the N datasets comprises a plurality of feature datasets.

In some embodiments, obtaining the similarity scores comprises transmitting to a server a request for similarity scores and receiving the similarity scores from the server.

In some embodiments, the set of N available datasets comprises a first available dataset and a second available dataset, and obtaining the similarity scores comprises: i) obtaining the first available dataset; ii) obtaining the second available dataset; and iii) calculating the similarity score using the first and second available datasets.

In some embodiments, the process further comprises determining a need to modify the model and after determining the need to modify the model, selecting one or more additional data sets included in the set of N available sets. The selected one or more additional data sets are not included in the selected subset. The process further comprises for each of the selected one or more additional data sets, transmitting a request for the dataset. The process further comprises receiving the selected one or more additional data sets and using the received datasets to modify the model.

In some embodiments, the process further comprises transmitting to network nodes the obtained set of similarity scores.

In some embodiments, the process further comprises: determining that (i) a time period has passed since the set of similarity scores was obtained or (ii) a particular condition is met; and as a result of the determination, obtaining an updated set of similarity scores, wherein each similarity score in the updated set indicates an updated similarity between one of the available datasets included in the set of N available datasets and another one of the available datasets included in the set of N available datasets.

In some embodiments, selecting the subset of available datasets comprises: (i) selecting a first dataset from the set of N available datasets, (ii) including the first dataset in the subset; (iii) removing from the set of available datasets each dataset that is similar to the first dataset, thereby producing a modified set of available datasets; (iv) selecting a dataset from the modified set of available datasets; and (v) including in the subset the dataset selected from the modified set of available datasets.

In some embodiments, removing from the set of available datasets each dataset that is similar to the first dataset comprises: (i) selecting a second dataset from the set of N available datasets; (ii) obtaining a similarity score that indicates a similarity between the first data set and the second dataset; (iii) determining whether the similarity score satisfies a condition; and (iv) as a result of determining that the similarity score satisfies the condition, removing the second dataset from the set of N available datasets.

In some embodiments, the process further comprises for each dataset included in the set of N available datasets, assigning a total similarity score to the dataset. The total similarity score assigned to the dataset identifies the total number of similarity scores that are associated with the dataset and that satisfies the condition. The step of selecting the first dataset from the set of N available datasets comprises selecting a dataset that has the lowest total similarity score.

Figure 13:
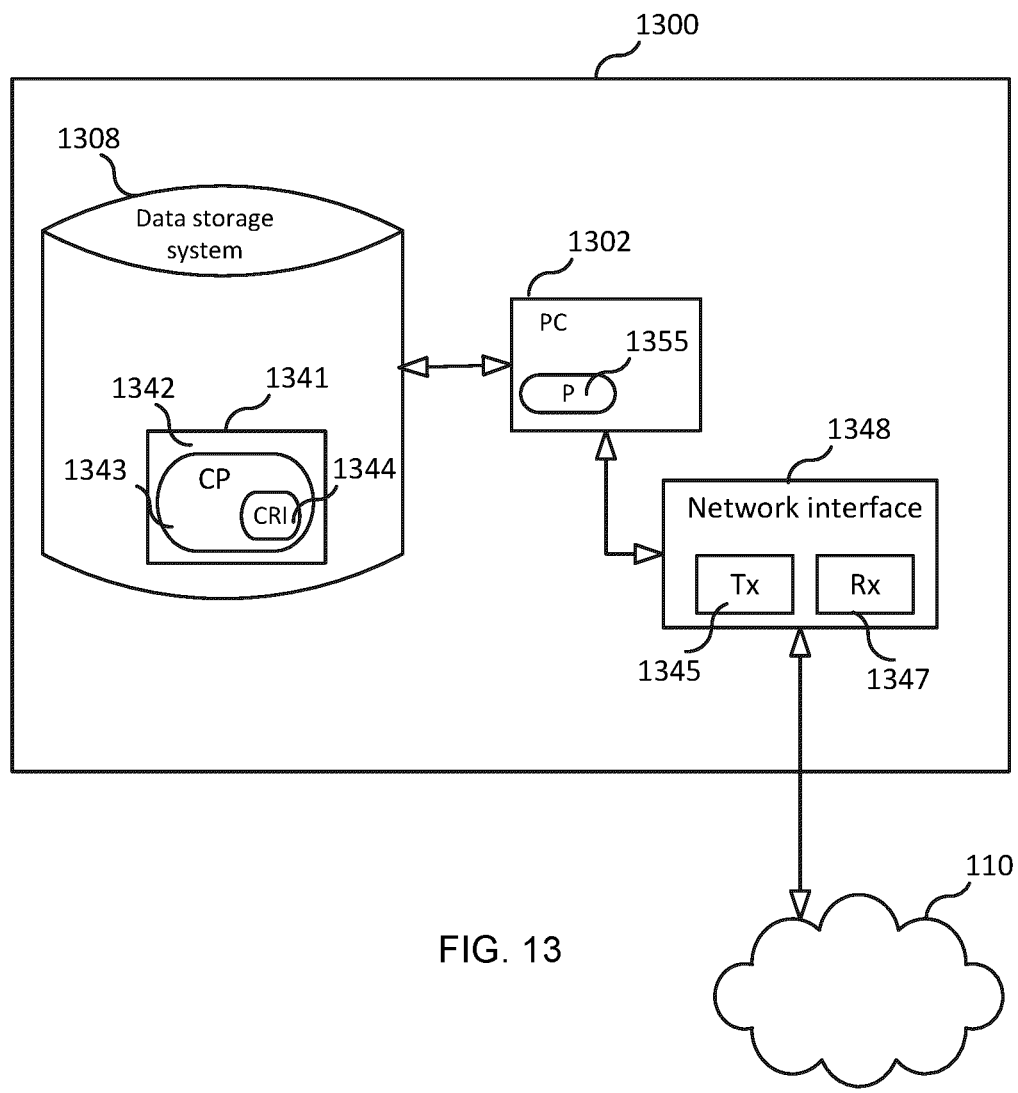
FIG. 13 is an apparatus according to an embodiment.

FIG. 13 is a block diagram of an apparatus 1300, according to some embodiments, for implementing any of the methods disclosed herein (e.g., apparatus 1300 may be UE 102 or another node). As shown in FIG. 13, apparatus 1300 may comprise: processing circuitry (PC) 1302, which may include one or more processors (P) 1355 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., apparatus 1300 may be a distributed computing apparatus); a network interface 1348 comprising a transmitter (Tx) 1345 and a receiver (Rx) 1347 for enabling apparatus 1300 to transmit data to and receive data from other nodes connected to a network 110 (e.g., an Internet Protocol (IP) network) to which network interface 1348 is connected (directly or indirectly) (e.g., network interface 1348 may be wirelessly connected to the network 110, in which case network interface 1348 is connected to an antenna arrangement); and a local storage unit (a.k.a., "data storage system") 1308, which may include one or more non-volatile storage devices and/or one or more volatile storage devices. In embodiments where PC 1302 includes a programmable processor, a computer program product (CPP) 1341 may be provided. CPP 1341 includes a computer readable medium (CRM) 1342 storing a computer program (CP) 1343 comprising computer readable instructions (CRI) 1344. CRM 1342 may be a non-transitory computer readable medium, such as, magnetic media (e.g., a hard disk), optical media, memory devices (e.g., random access memory, flash memory), and the like. In some embodiments, the CRI 1344 of computer program 1343 is configured such that when executed by PC 1302, the CRI causes apparatus 1300 to perform steps described herein (e.g., steps described herein with reference to the flow charts). In other embodiments, apparatus 1300 may be configured to perform steps described herein without the need for code. That is, for example, PC 1302 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes and message flows described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A computer implemented method for reducing the amount of data transmitted to a network node of a wireless communication system, wherein the network node is configured to use the data to create or modify a model, the method being performed by the network node and comprising:
    obtaining information identifying a set of N available datasets, wherein N is greater than or equal to 2;
    obtaining a set of similarity scores, wherein each similarity score indicates a similarity between one of the available datasets included in the set of N available datasets and another one of the available datasets included in the set of N available datasets;
    based on the obtained similarity scores, selecting M of N available datasets, wherein M is less than N, and further wherein, each one of the selected M datasets is associated with M−1 of the similarity scores and the M−1 similarity scores with which a dataset is associated indicates that the dataset is not similar to any one of the other selected datasets;
    requesting the M selected datasets;
    receiving the requested datasets; and
    using the received datasets to construct or modify the model, wherein
    selecting the M datasets comprises:
        selecting a first dataset from the set of N available datasets;
        after selecting the first dataset, removing from the set of available datasets each dataset that is similar to the first dataset, thereby producing a modified set of available datasets, wherein the modified set of available datasets does not include any dataset that is similar to the first dataset; and
        selecting a second dataset from the modified set of available datasets.

2. The computer implemented method of claim 1, wherein each one of the N datasets i) is a feature dataset or ii) comprises a plurality of feature datasets.

3. The computer implemented method of claim 1, wherein obtaining the similarity scores comprises transmitting to a server a request for similarity scores and receiving the similarity scores from the server.

4. The computer implemented method of claim 1, wherein
    the set of N available datasets comprises a first available dataset and a second available dataset, and
    obtaining the similarity scores comprises:
    i) obtaining the first available dataset;
    ii) obtaining the second available dataset; and
    iii) calculating the similarity score using the first and second available datasets.

5. The computer implemented method of claim 1, the method further comprising:
    determining a need to modify the model;
    after determining the need to modify the model, selecting one or more additional datasets included in the set of N available datasets, wherein the selected one or more additional datasets are not included in the selected subset of M datasets;
    for each of the selected one or more additional datasets, transmitting a request for the dataset;
    receiving the selected one or more additional datasets; and
    using the received datasets to modify the model.

6. The computer implemented method of claim 1, the method further comprising:
    transmitting to network nodes the obtained set of similarity scores.

7. The computer implemented method of claim 1, the method further comprising:
    determining that (i) a time period has passed since the set of similarity scores was obtained or (ii) a particular condition is met; and
    as a result of the determination, obtaining an updated set of similarity scores, wherein each similarity score in the updated set indicates an updated similarity between one of the available datasets included in the set of N available datasets and another one of the available datasets included in the set of N available datasets.

8. The computer implemented method of claim 1, wherein removing from the set of available datasets each dataset that is similar to the first dataset comprises:
    selecting a second dataset from the set of N available datasets;
    obtaining a similarity score that indicates a similarity between the first dataset and the second dataset;
    determining whether the similarity score satisfies a condition; and
    as a result of determining that the similarity score satisfies the condition, removing the second dataset from the set of N available datasets.

9. The computer implemented method of claim 8, further comprising:
    for each dataset included in the set of N available datasets, assigning a total similarity score to the dataset, wherein the total similarity score assigned to the dataset identifies the total number of similarity scores that are associated with the dataset and that satisfies the condition, wherein the step of selecting the first dataset from the set of N available datasets comprises selecting a dataset that has the lowest total similarity score.

10. An apparatus for reducing the amount of data transmitted to the apparatus, wherein the apparatus is configured to use the data to create or modify a model, the apparatus being configured to perform a method comprising:
obtaining information identifying a set of N available datasets, wherein N is greater than or equal to 2;
obtaining a set of similarity scores, wherein each similarity score indicates a similarity between one of the available datasets included in the set of N available datasets and another one of the available datasets included in the set of N available datasets;
based on the obtained similarity scores, selecting M of N available datasets, wherein M is less than N, and further wherein, each one of the selected M datasets is associated with M−1 of the similarity scores and the M−1 similarity scores with which a dataset is associated indicates that the dataset is not similar to any one of the other selected datasets;
requesting the M selected datasets;
receiving the requested datasets; and
using the received datasets to construct or modify the model, wherein
selecting the M datasets comprises:
selecting a first dataset from the set of N available datasets;
after selecting the first dataset, removing from the set of available datasets each dataset that is similar to the first dataset, thereby producing a modified set of available datasets, wherein the modified set of available datasets does not include any dataset that is similar to the first dataset; and
selecting a second dataset from the modified set of available datasets.

11. The apparatus of claim 10, wherein each one of the N datasets i) is a feature dataset or ii) comprises a plurality of feature datasets.

12. The apparatus of claim 10, wherein obtaining the similarity scores comprises transmitting to a server a request for similarity scores and receiving the similarity scores from the server.

13. The apparatus of claim 10, wherein
the set of N available datasets comprises a first available dataset and a second available dataset, and
obtaining the similarity scores comprises:
i) obtaining the first available dataset;
ii) obtaining the second available dataset; and
iii) calculating the similarity score using the first and second available datasets.

14. The apparatus of claim 10, wherein the method further comprises:
determining a need to modify the model;
after determining the need to modify the model, selecting one or more additional datasets included in the set of N available datasets, wherein the selected one or more additional datasets are not included in the selected subset of M datasets;
for each of the selected one or more additional datasets, transmitting a request for the dataset;
receiving the selected one or more additional datasets; and
using the received datasets to modify the model.

15. The apparatus of claim 10, wherein the method further comprises:
transmitting to network nodes the obtained set of similarity scores.

16. The apparatus of claim 10, wherein the method further comprises:
determining that (i) a time period has passed since the set of similarity scores was obtained or (ii) a particular condition is met; and
as a result of the determination, obtaining an updated set of similarity scores, wherein each similarity score in the updated set indicates an updated similarity between one of the available datasets included in the set of N available datasets and another one of the available datasets included in the set of N available datasets.

17. The apparatus of claim 10, wherein removing from the set of available datasets each dataset that is similar to the first dataset comprises:
selecting a second dataset from the set of N available datasets;
obtaining a similarity score that indicates a similarity between the first dataset and the second dataset;
determining whether the similarity score satisfies a condition; and
as a result of determining that the similarity score satisfies the condition, removing the second dataset from the set of N available datasets.

18. The apparatus of claim 17, wherein:
the method further comprises, for each dataset included in the set of N available datasets, assigning a total similarity score to the dataset, wherein the total similarity score assigned to the dataset identifies the total number of similarity scores that are associated with the dataset and that satisfies the condition, and
the step of selecting the first dataset from the set of N available datasets comprises selecting a dataset that has the lowest total similarity score.

* * * * *